United States Patent
Ko et al.

(10) Patent No.: US 11,403,878 B2
(45) Date of Patent: Aug. 2, 2022

(54) APPARATUS AND METHOD WITH USER VERIFICATION

(71) Applicant: SAMSUNG ELECTRONICS CO., LTD., Suwon-si (KR)

(72) Inventors: Minsu Ko, Suwon-si (KR); Seungju Han, Seoul (KR); Wonsuk Chang, Hwaseong-si (KR); Jaejoon Han, Seoul (KR); Seon Min Rhee, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 16/728,056

(22) Filed: Dec. 27, 2019

(65) Prior Publication Data
US 2020/0210685 A1    Jul. 2, 2020

(30) Foreign Application Priority Data

Dec. 31, 2018   (KR) .................. 10-2018-0173859
Apr. 25, 2019   (KR) .................. 10-2019-0048363

(51) Int. Cl.
*G06K 9/62*       (2022.01)
*G06V 40/16*      (2022.01)
(Continued)

(52) U.S. Cl.
CPC ......... *G06V 40/172* (2022.01); *G06F 21/32* (2013.01); *G06V 40/171* (2022.01); *G06V 40/50* (2022.01)

(58) Field of Classification Search
CPC ......... G06K 9/00288; G06K 9/00295; G06K 9/00221–2009/00328; G06K 9/36–9/42; G06K 9/00926
See application file for complete search history.

(56) References Cited

U.S. PATENT DOCUMENTS

| | | | | |
|---|---|---|---|---|
| 5,864,834 A | * | 1/1999 | Arai ..................... | G06N 3/04 706/16 |
| 7,330,591 B2 | * | 2/2008 | Fukui ................. | G06K 9/00288 382/118 |

(Continued)

FOREIGN PATENT DOCUMENTS

| | | | | |
|---|---|---|---|---|
| JP | 2007072620 A | * | 3/2007 | ........... G06K 9/6214 |
| KR | 10-2005-0091558 A | | 9/2005 | |

(Continued)

OTHER PUBLICATIONS

Chen, W et al., "Illumination Compensation and Normalization for Robust Face Recognition Using Discrete Cosine Transform in Logarithm Domain", *IEEE Transactions on Systems, Man, and Cybernetics*, vol. 36, No. 2 Apr. 2006, pp. 458-466 (9 pages in English).

(Continued)

*Primary Examiner* — Brian Werner
(74) *Attorney, Agent, or Firm* — NSIP Law

(57) ABSTRACT

A processor-implemented verification method includes: detecting a characteristic of an input image; acquiring input feature transformation data and enrolled feature transformation data by respectively transforming input feature data and enrolled feature data based on the detected characteristic, wherein the input feature data is extracted from the input image using a feature extraction model; and verifying a user corresponding to the input image based on a result of comparison between the input feature transformation data and the enrolled feature transformation data.

30 Claims, 9 Drawing Sheets

(51) Int. Cl.
*G06F 21/32* (2013.01)
*G06V 40/50* (2022.01)

(56) References Cited

U.S. PATENT DOCUMENTS

| | | |
|---|---|---|
| 8,706,668 B2 | 4/2014 | Melvin et al. |
| 9,042,609 B2 | 5/2015 | Todoroki |
| 9,704,025 B2 | 7/2017 | Al-Qunaieer et al. |
| 2016/0379041 A1 | 12/2016 | Rhee et al. |
| 2017/0046563 A1 | 2/2017 | Kim et al. |
| 2018/0060698 A1 | 3/2018 | Hua et al. |
| 2018/0373924 A1 | 12/2018 | Yoo et al. |
| 2021/0180571 A1* | 6/2021 | Yang ............... F03D 17/00 |

FOREIGN PATENT DOCUMENTS

| | | |
|---|---|---|
| KR | 10-2007-0097636 A | 10/2007 |
| KR | 10-2008-0085975 A | 9/2008 |
| KR | 10-2011-0051714 A | 5/2011 |
| KR | 10-1373274 B1 | 3/2014 |
| KR | 10-1382892 B1 | 4/2014 |
| KR | 10-2015-0042674 A | 4/2015 |
| KR | 10-2015-0135745 A | 12/2015 |
| KR | 10-2017-0018666 A | 2/2017 |
| KR | 10-1839827 B1 | 3/2018 |

OTHER PUBLICATIONS

Crispell, Daniel, et al. "Dataset augmentation for pose and lighting invariant face recognition." arXiv preprint arXiv:1704.04326, 2017 (9 pages in English).
Ranjan, Rajeev, et al. "Deep learning for understanding faces: Machines may be just as good, or better, than humans." *IEEE Signal Processing Magazine* vol. 35, Issue 1, 2018 (18 pages in English).
Extended European Search Report dated May 8, 2020 in counterpart European Patent Application No. 19216887.0 (12 pages in English).

* cited by examiner

APPARATUS AND METHOD WITH USER VERIFICATION

CROSS-REFERENCE TO RELATED APPLICATIONS

This application claims the benefit under 35 USC § 119(a) of Korean Patent Application No. 10-2018-0173859 filed on Dec. 31, 2018 in the Korean Intellectual Property Office and Korean Patent Application No. 10-2019-0048363 filed on Apr. 25, 2019 in the Korean Intellectual Property Office the entire disclosures of which are incorporated herein by reference for all purposes.

BACKGROUND

1. Field

The following description relates to an apparatus and method with user verification.

2. Description of Related Art

A method of applying computer-implemented pattern recognition may include a neural network. To classify an input pattern into a predetermined group, the neural network may represent a learned capability. The neural network may generate a mapping between the input pattern and output patterns, and may have a capability of generating an output even for an input pattern yet to be used for learning, based on a result of learning based on other input patterns.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented verification method includes: detecting a characteristic of an input image; acquiring input feature transformation data and enrolled feature transformation data by respectively transforming input feature data and enrolled feature data based on the detected characteristic, wherein the input feature data is extracted from the input image using a feature extraction model; and verifying a user corresponding to the input image based on a result of comparison between the input feature transformation data and the enrolled feature transformation data.

The input image may include a facial image of the user.

The verifying of the user may include determining whether the user is an enrolled user corresponding to the enrolled feature data, and the enrolled feature data was previously extracted using the feature extraction model.

The characteristic may be an illuminance characteristic of the input image.

The detecting of the characteristic may include: detecting at least one of a landmark characteristic associated with a landmark of an object appearing in the input image and an environment characteristic associated with a capturing environment of the input image.

The object may be a face of the user and the landmark may be one of a facial feature and an item disposed on the face.

The feature extraction model may be a trained neural network.

The trained neural network may include a convolutional neural network (CNN).

The acquiring of the input feature transformation data and the enrolled feature transformation data may include: generating the input feature transformation data by applying a transformation function corresponding to the characteristic to the input feature data; and generating the enrolled feature transformation data by applying the transformation function to the enrolled feature data.

The transformation function may be determined differently for the user than for another user.

The transformation function may be determined in a user-enrollment process comprising enrolling the enrolled feature data.

The acquiring of the input feature transformation data and the enrolled feature transformation data may include: respectively transforming the input feature data and the enrolled feature data using a linear transformation or a nonlinear transformation determined based on the characteristic.

The detecting of the characteristic may include detecting a plurality of characteristics of the input image, including the characteristic, the acquiring of the input feature transformation data may include calculating, as the input feature transformation data, a weighted sum of results obtained by applying transformation functions corresponding to the plurality of characteristics to the input feature data, and the acquiring of the enrolled feature transformation data may include calculating, as the enrolled feature transformation data, a weighted sum of results obtained by applying the transformation functions to the enrolled feature data.

The acquiring of the input feature transformation data and the enrolled feature transformation data may include: respectively performing a projection operation corresponding to the characteristic on the input feature data and the enrolled feature data.

The acquiring of the input feature transformation data and the enrolled feature transformation data may include: determining target dimensional component information based on the characteristic; and generating the input feature transformation data and the enrolled feature transformation data respectively based on the input feature data and the enrolled feature data by maintaining a target dimensional component and excluding a remaining dimensional component.

The method may include: selecting a reference user to be verified from a plurality of enrolled users, wherein the determining of the target dimensional component information may include loading target dimensional component information corresponding to the characteristic from a database based on transformation-related information mapped to enrolled feature data of the reference user.

The method may include: selecting a reference user to be verified from a plurality of enrolled users, wherein the acquiring of the input feature transformation data and the enrolled feature transformation data may include loading a transformation function corresponding to the characteristic from a database, among a plurality of transformation functions mapped to enrolled feature data of the reference user.

The method may include: extracting reference feature data from a reference image of a reference user in response to the reference user being enrolled; extracting augmented feature data from an augmented image acquired by augmenting the reference image based on an augmentation characteristic; and determining a transformation function associated with the augmentation characteristic based on a comparison between the reference feature data and the augmented feature data, mapping the determined transformation function to the reference user, and storing the mapped transformation function.

The augmentation characteristic may correspond to the detected characteristic of the input image, and the acquiring of the input feature transformation data and the enrolled feature transformation data may include: generating the input feature transformation data by applying the transformation function to the input feature data; and generating the enrolled feature transformation data by applying the transformation function to the enrolled feature data.

The determining of the transformation function may include: calculating a variation score for each dimensional component of the reference feature data and the augmented feature data; and determining a transformation function associated with the augmentation characteristic based on the variation score.

The determining of the transformation function may include: determining, to be a target dimensional component, a dimensional component, among the dimensional components, corresponding to a dimension index indicating a variation score less than or equal to a change threshold among a plurality of dimension indices in the variation score; and determining, to be a remaining dimensional component, a dimensional component, among the dimensional components, corresponding to a dimension index indicating a variation score greater than the change threshold in the variation score.

The verifying of the user corresponding to the input image may include: calculating a similarity between the input feature transformation data and the enrolled feature transformation data; and determining that a verification for the user is successful in response to the similarity being greater than a threshold similarity.

The calculating of the similarity may include: calculating a cosine similarity between a feature indicated by the input feature transformation data and a feature indicated by the enrolled feature transformation data.

The verifying of the user corresponding to the input image may include: indicating a result of the verifying of the user.

The indicating of the result of the verifying of the user may include: unlocking a device in response to the result of the verifying of the user being a successful verification.

A non-transitory computer-readable storage medium may store instructions that, when executed by one or more processors, configure the one or more processors to perform the method.

In another general aspect, a verification apparatus includes: an image acquirer configured to acquire an input image; and one or more processors configured to: detect a characteristic of the input image, acquire input feature transformation data and enrolled feature transformation data by respectively transforming input feature data and enrolled feature data based on the detected characteristic, wherein the input feature data is extracted from the input image using a feature extraction model and the enrolled feature data is previously extracted using the feature extraction model, and verify a user corresponding to the input image based on a result of comparison between the input feature transformation data and the enrolled feature transformation data.

The apparatus may be any one of an image processing device, a smartphone, a wearable device, a tablet computer, a netbook, a laptop, a desktop, a personal digital assistant (PDA), a set-top box, a home appliance, a biometric door lock, a security device, and a vehicle starter, and the image acquirer may include a camera.

In another general aspect, a processor-implemented user enrollment method may include: extracting reference feature data from a reference image acquired for user enrollment of a reference user; extracting augmented feature data from an augmented image acquired by augmenting the reference image based on an augmentation characteristic; mapping a transformation function associated with the augmentation characteristic to the reference user based on a comparison between the reference feature data and the augmented feature data; and verifying an input image using the transformation function in response to the input image being acquired.

In another general aspect, a processor-implemented verification method may include: acquiring a transformation function corresponding to a characteristic of an input image including a face of a user; generating input feature transformation data by transforming input feature data of the input image using the transformation function; generating enrolled feature transformation data by transforming enrolled feature data of an enrolled user using the transformation function; and verifying whether the user is the enrolled user based on a comparison of the input feature transformation data and the enrolled feature transformation data.

The transformation function may be generated by: generating reference feature data from an image of the enrolled user; generating an augmented image by augmenting the image of the enrolled user to include the characteristic; generating augmented feature data from the augmented image; and generating the transformation function based on a comparison of the reference feature data and the augmented feature data.

Other features and aspects will be apparent from the following detailed description, the drawings, and the claims.

Figure 1:
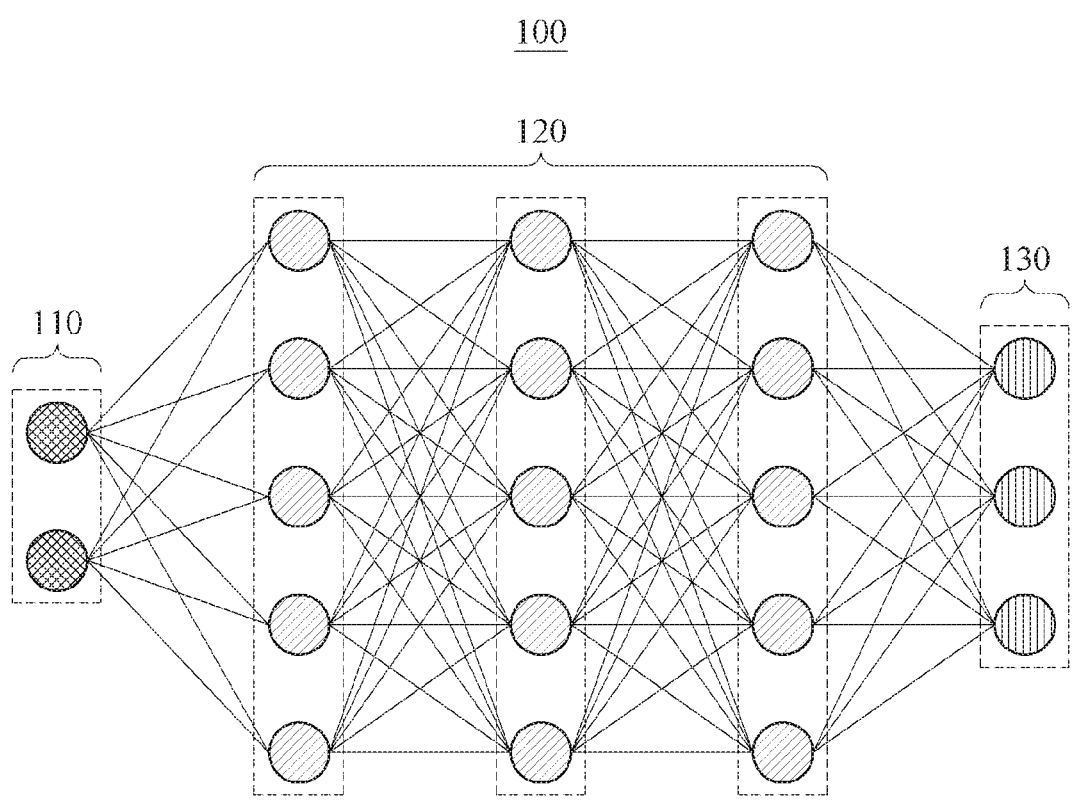
FIG. 1 illustrates an example of a feature extraction model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "comprises/comprising" and/or "includes/including," when used herein, specify the presence of stated features, integers, operations, elements, and/or components, but do not preclude the presence or addition of one or more other features, integers, operations, elements, components and/or groups thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a diagram illustrating an example of a structure of a feature extraction model.

A verification apparatus may verify a user using feature data extracted from an input image. The verification apparatus may extract the feature data from the input image based on a feature extraction model. The feature data may be data in which an image is abstracted and may be in a form of, for example, a vector. The feature extraction model may be a model designed to extract the feature data from an image and, for example, may be in a machine-learning structure. The feature extraction model may include a neural network 100.

The neural network 100 may correspond to an example of a deep neural network (DNN). The DNN may include a fully connected network, a deep convolutional network, and/or a recurrent neural network. The neural network 100 may perform object classification, object recognition, speech recognition, and/or image recognition by mapping input data and output data having a non-linear relationship to each other based on deep learning. Deep learning is a machine learning technique that may be used to perform image or speech recognition by learning from a large dataset, and may map the input data and the output data through supervised or unsupervised learning.

Throughout this disclosure, the term "recognition" includes data verification and/or identification. The verification is an operation of determining whether input data is true or false. For example, the verification may be an operation of determining whether an object (for example, a human face) indicated by a predetermined input image is the same as an object indicated by a reference image. The verification apparatus may verify whether data acquired through an extraction from an input image is the same as enrolled data pre-enrolled in the apparatus and, in response to the acquired data being the same as the enrolled data, determine that a verification of a user corresponding to the input image is successful. However, embodiments are not limited thereto. When a plurality of items of enrolled data is stored in the verification apparatus, the verification apparatus may sequentially verify data acquired through an extraction from an input image for each item of the enrolled data.

The identification is a classification operation of determining a label indicated by input data among a plurality of labels. For example, each of the labels may indicate an identity (ID) of each enrolled user. For example, through the identification, whether a user included in input data is a male or a female may be indicated.

Referring to FIG. 1, the neural network 100 may include an input layer 110, a hidden layer 120, and an output layer 130. The input layer 110, the hidden layer 120, and the output layer 130 may each include a plurality of nodes.

For ease of description, FIG. 1 illustrates three hidden layers 120. However, the hidden layer 120 may include various numbers of layers (e.g., less or more than three hidden layers 120). Further, FIG. 1 illustrates the neural network 100 including a separate input layer to receive input data. However, in an example, the input data may be input directly into the hidden layer 120. In the neural network 100, nodes of a layer (excluding the output layer 130) may be connected to nodes of a subsequent layer through links to transmit output signals. The number of links may correspond to the number of nodes included in the subsequent layer (e.g., in an example where each node of the layer may be connected to each node of the subsequent layer).

An output of an activation function related to weighted inputs of nodes included in a previous layer may be input into each node of the hidden layer 120. The weighted inputs may be obtained by multiplying inputs of the nodes included in the previous layer by a weight. The weight may be referred to as a parameter of the neural network 100. The activation function may include a sigmoid, a hyperbolic tangent (tan h), and/or a rectified linear unit (ReLU), and a non-linearity may be formed in the neural network 100 by the activation function. The weighted inputs of the nodes included in the previous layer may be input into the nodes of the output layer 130.

When input data is given, the neural network 100 may calculate function values based on the number of classes to be identified in the output layer 130 through the hidden layer 120, and identify the input data as a class having a greatest value among the function values. The neural network 100 may identify the input data. However, embodiments are not limited thereto. The neural network 100 may verify the input data with respect to reference data. Hereinafter, a recognition process will be described as a verification process. The following description may also apply to an identification process.

The neural network 100 has a capacity determined sufficient to implement a predetermined function. When the neural network 100 learns based on training data through a training process, the neural network 100 achieves an optimal recognition performance, e.g., of a predetermined accuracy and/or minimum inaccuracy.

The neural network 100 is described above as an example of the feature extraction model. However, the feature extraction model is not limited to the neural network 100. Hereinafter, a verification operation using feature data extracted based on a feature extraction model will be described.

Figure 2:
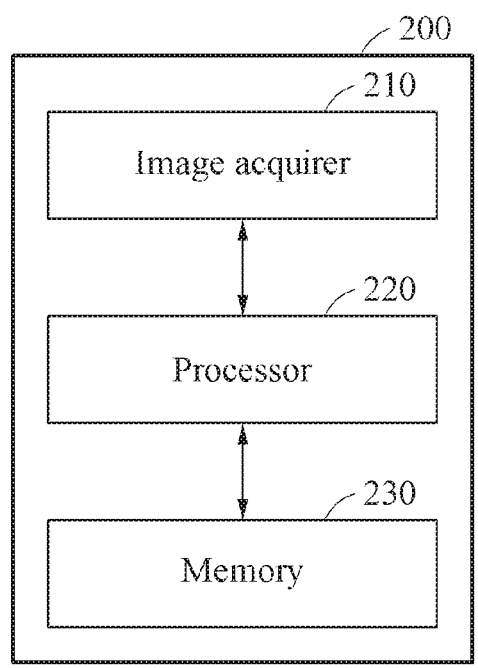
FIG. 2 is a block diagram illustrating an example of a verification apparatus.

FIG. 2 is a block diagram illustrating an example of a verification apparatus.

A verification apparatus 200 is an apparatus for verifying a user and may include an image acquirer 210, a processor 220 (e.g., one or more processors), and a memory 230.

The verification apparatus 200 may determine whether a user (e.g., a user attempting to gain access to the verification apparatus 200 or another apparatus) has an access authority based on a verification result of data (for example, an input image corresponding to the user). For example, the verification apparatus 200 may verify input data through the verification described with reference to FIG. 1. When it is determined that the user is the same as an enrolled user, the verification apparatus 200 may determine that the verification is successful. The verification apparatus 200 may allow or block the access of the user to a corresponding apparatus (e.g., the verification apparatus 200 or another apparatus) based on a verification result of the user. When the verification is successful, the verification apparatus 200 may allow the user to access the corresponding apparatus. When the verification has failed or is unsuccessful, the verification apparatus 200 may block the user from accessing the corresponding apparatus. In an example, allowing a user to access the corresponding apparatus includes canceling a lock state of the corresponding apparatus such that the user may have access to one or more functions and/or applications of the corresponding apparatus not available to the user while the corresponding apparatus is in the lock state.

The image acquirer 210 may acquire an input image from a user. The image acquirer 210 may include a camera sensor, an infrared sensor, a depth sensor, and/or a thermal image sensor, as non-limiting examples. The camera sensor may be a sensor that senses light in a wavelength range belonging to visible light and may generate channel images corresponding to a red channel, a green channel, and/or a blue channel, as non-limiting examples. The infrared sensor may be a sensor that senses light of an infrared wavelength. The depth sensor may generate a depth image indicating a distance from an object. However, the image acquirer 210 is not limited thereto.

The processor 220 may detect a characteristic of the input image. The characteristic may be information indicating characteristics associated with an object and an environment appearing in an image. The characteristic may include a landmark characteristic associated with a landmark of an object and an environment characteristic associated with a capturing environment of the input image. In an example, the object may be a human face and the landmark may be a feature or item on the human face. The landmark characteristic may be a characteristic associated with a landmark of an object (e.g., the human face) and may indicate a presence or absence of the landmark (e.g., an eyebrow), whether the landmark (e.g., an accessary such as glasses or sunglasses) is worn, a shape of the landmark (e.g., a mouth), and/or a facial expression of the object (e.g., a smile face, an angry face, and/or an expressionless face). The environment characteristic may be a characteristic associated with an environment, and may include an illuminance characteristic indicating an environment of which an ambient illuminance is a low illuminance or an environment of which an ambient illuminance is a high illuminance.

Also, the processor 220 may acquire input feature transformation data and enrolled feature transformation data by respectively transforming, based on the detected characteristic, input feature data (extracted from the input image) and enrolled feature data (enrolled before the input image is acquired). For example, the processor 220 may acquire the input feature transformation data and the enrolled feature transformation data by respectively applying the same transformation function to the input feature data and the enrolled feature data. The input feature transformation data and the enrolled feature transformation data may each be, for example, in a form of a vector but not be limited thereto. The processor 220 may transform the input feature data into the input feature transformation data and the enrolled feature data into the enrolled feature transformation data using a linear transformation or a non-linear transformation determined based on the characteristic (for example, an image illuminance). The input feature transformation data and the enrolled feature transformation data may be data obtained by respectively transforming the input feature data and the enrolled feature data to a feature space that is robust to a change occurring due to the characteristic.

The processor 220 may verify a user corresponding to the input image based on a result of comparison between the input feature transformation data and the enrolled feature transformation data. The processor 220 may determine whether a verification for a user is successful based on a similarity between the input feature transformation data and the enrolled feature transformation data.

The memory 230 may temporarily or permanently store data required to perform a verification method and an enrollment method. Also, the memory 230 may store the feature extraction model and a parameter corresponding to the feature extraction model. The memory 230 may store feature data extracted from the feature extraction model. The memory 230 may store an enrollment database including enrolled feature data corresponding to an enrolled user and transformation functions mapped to the enrolled feature data.

The verification apparatus 200 may perform the verification using the feature data transformed based on the characteristic of the input image (e.g., the input feature transformation data), thereby improving a verification performance for the user in various capturing environments or in an occlusion state. For example, the verification apparatus 200 may transform the input feature data and the enrolled feature data to a feature space that offsets influences of an occlusion by the accessary such as glasses and a low illuminance environment. The transformed feature data may indicate similar values with respect to the same user even in various environment characteristics and landmark characteristics. Accordingly, the verification apparatus 200 more accurately performs verification compared to a typical verification apparatus in which influences of the occlusion (which hinder verification accuracy) are not offset.

Figure 3:
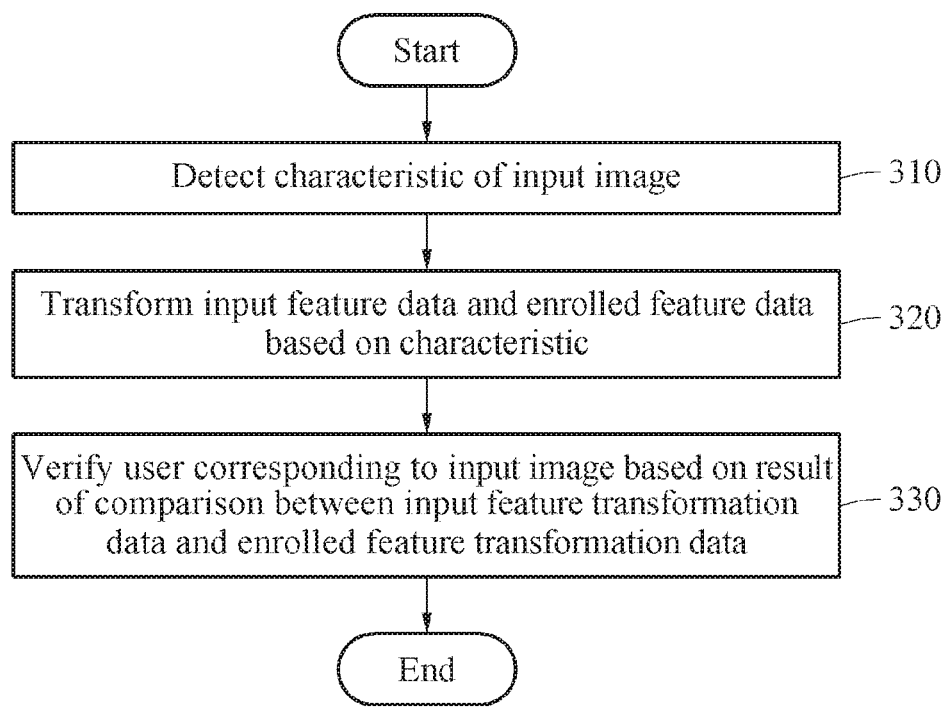
FIG. 3 is a flowchart illustrating an example of a verification method.

FIG. 3 is a flowchart illustrating an example of a verification method.

In operation 310, a verification apparatus may detect a characteristic of an input image from the input image. The verification apparatus may detect a landmark characteristic and/or an environment characteristic as the characteristic of the input image by analyzing the input image. For example, the verification apparatus may detect an illuminance at which an image is captured as an environment characteristic of the input image. Also, the verification apparatus may detect whether an object (e.g., a human face) is wearing an accessary (e.g., glasses) as a landmark characteristic of the input image.

In operation 320, the verification apparatus may acquire input feature transformation data and enrolled feature transformation data by respectively transforming, based on the detected characteristic (for example, an image illuminance), input feature data (extracted from the input image) and enrolled feature data (enrolled before the input image is acquired). The verification apparatus may generate the input feature transformation data by applying a transformation function corresponding to the characteristic to the input feature data. The verification apparatus may generate the enrolled feature transformation data by applying the transformation function corresponding to the characteristic to the enrolled feature data.

In operation 330, the verification apparatus may verify a user corresponding to the input image based on a result of a comparison between the input feature transformation data and the enrolled feature transformation data. The verification apparatus may indicate a verification result of a user of the input image based on the input feature transformation data and the enrolled feature transformation data. The verification apparatus may unlock a device in response to a verification for the user of the input image being successful. An unlocking operation of the device may be, for example, an operation of allowing an access to at least one application in the device. Before a verification operation for the user of the input image is performed, the verification apparatus may preset which applications in the device a given enrolled user will be allowed to access upon successful verification. The device may execute the application to which the enrolled user is allowed to access in response to a user input.

Figure 4:
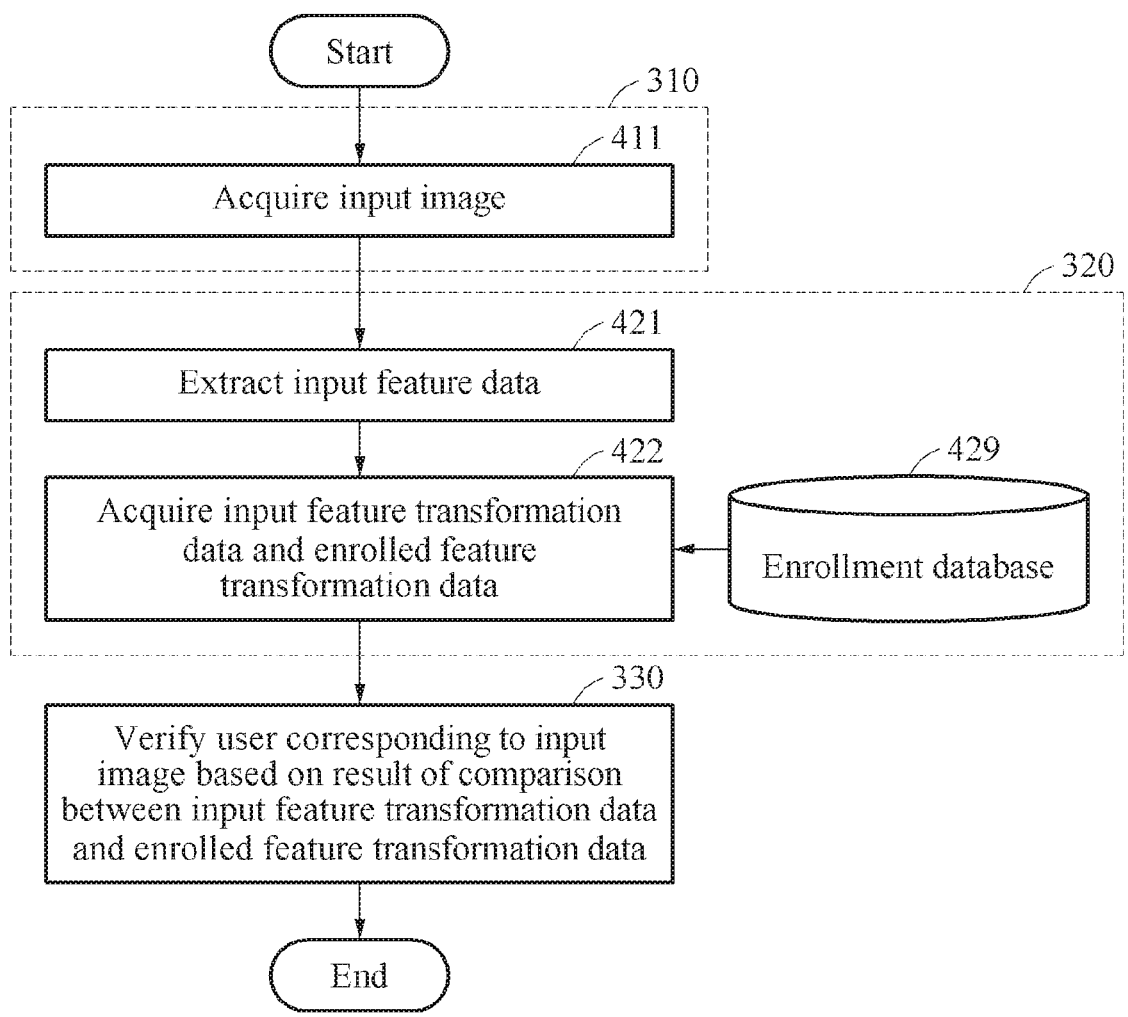
FIGS. 4 and 5 are flowcharts illustrating examples of a verification method.
Figure 5:
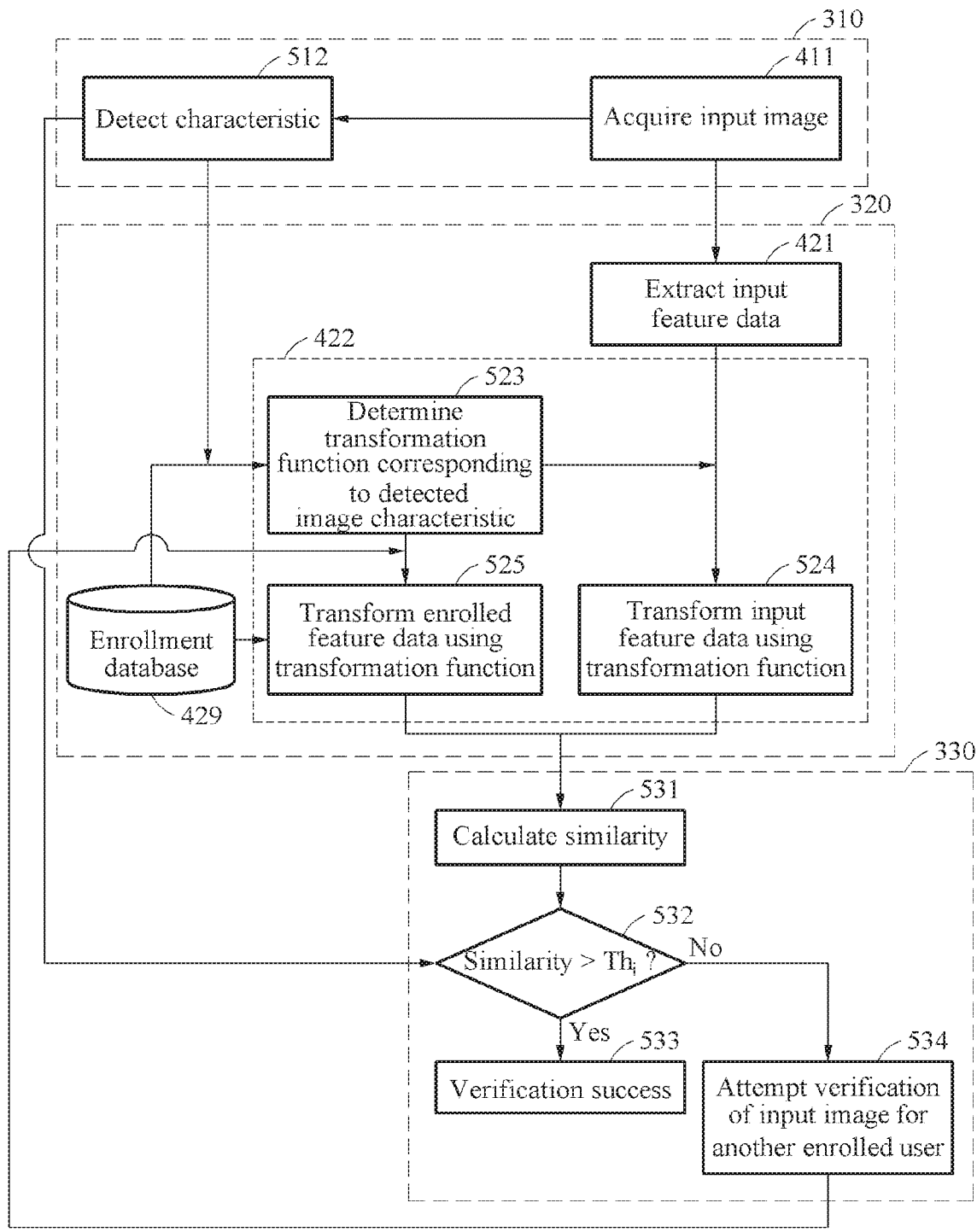

FIGS. 4 and 5 are flowcharts illustrating examples of an operation of a verification method.

In operation 411, a verification apparatus may acquire an input image. The verification apparatus may use a camera sensor to generate an image including an object associated with a user, for example, a face.

Referring to FIG. 5, in operation 512, the verification apparatus may detect a characteristic. The verification apparatus may detect a landmark characteristic associated with a landmark of an object appearing in the input image and/or an environment characteristic associated with a capturing environment of the input image. For example, the verification apparatus may detect an $i^{th}$ characteristic corresponding to an input image among N characteristics. In an example, the $i^{th}$ characteristic may be a low-illuminance characteristic that is an environment characteristic indicating an illuminance of an environment in which the input image is captured is lower than a threshold illuminance.

In operation 421, the verification apparatus may extract the input feature data. The verification apparatus may extract the input feature data from the input image based on a feature extraction model in a form of a trained neural network. The input feature data may be expressed in a form of a vector as shown in Equation 1 below, for example.

$$\alpha = \text{feat}_{input} = [v_1, v_2, \ldots, v_M] \qquad \text{Equation 1:}$$

In Equation 1, input feature data $\text{feat}_{input}$ is an M-dimensional feature, M being an integer greater than or equal to 1. A $j^{th}$ dimensional component $\text{feat}_{input}(j)$ of the input feature data $\text{feat}_{input}$ may be $v_j$ is a dimension index and an integer of 1 to M inclusive. For ease of description, the input feature data $\text{feat}_{input}$ may also be referred to as a feature a, and the enrolled feature data $\text{feat}_{enrolled}$ may also referred to as a feature b.

In operation 422, the verification apparatus may acquire input feature transformation data and enrolled feature transformation data. The verification apparatus may acquire the input feature transformation data by transforming the input feature data a and acquire the enrolled feature transformation data by transforming enrolled feature data b. In operation 525, the verification apparatus may load the enrolled feature data b corresponding to an enrolled user to be verified from an enrollment database 429.

Here, as illustrated in FIG. 5, in operation 523, the verification apparatus may determine a transformation function corresponding to the detected characteristic. The transformation function may be a function for transforming feature data such that a dimensional component having a small variation in accordance with a characteristic is maintained. For example, the transformation function may be used to transform feature data such that a dimensional component having a large variation in accordance with a characteristic is excluded. When the detected characteristic matches a transformation condition, the feature data may be transformed. Otherwise, the feature data may be used without transformation. For example, when a detected image illuminance matches a low illuminance condition, the feature data may be transformed using a low-illuminance transformation function. Otherwise, the feature data may be used without a change or transformation.

Transformation functions corresponding to individual characteristics may be mapped to individual enrolled users. When N types of characteristics are provided, N transformation functions corresponding to individual characteristics may be mapped to individual enrolled users. The verification apparatus may select a reference user to be verified from a plurality of enrolled users. The verification apparatus may load a transformation function corresponding to the characteristic from a database, from among a plurality of transformation functions mapped to the enrolled feature data b of the reference user. For example, the verification apparatus may select an $i^{th}$ transformation function from the N transformation functions. When the $i^{th}$ characteristic is the low-illuminance characteristic, the $i^{th}$ transformation function may be a function for transforming feature data to a feature space robust to a low-illuminance environment.

The transformation function may include, for example, a linear transformation, a non-linear transformation, and/or a projection transformation. Although a projection function is representatively described as an example of the transformation function in this disclosure, a type of the transformation function is not limited to the example. The projection function may be in a form of a function of a projection operation. The projection operation may be an operation of maintaining a target dimensional component and excluding a remaining dimensional component. For example, the projection operation may be an operation of preserving an element value of the target dimensional component indicated by a target dimension index in feature data and changing an element value of the remaining dimensional component indicated by a remaining dimension index to 0. In each of the N transformation functions, a target dimensional component robust to a change may vary based on a corresponding characteristic. An example operation of determining and mapping the target dimensional component and the remaining dimensional component for each characteristic by individual enrolled users will be described further below with reference to FIG. 8.

When the projection function is used as the transformation function, transformation-related information may be mapped for each enrolled user in the enrollment database 429. The transformation-related information may define a target dimension index (indicating a target dimensional component varying for each of N characteristics) and a remaining dimension index (indicating a remaining dimensional component). The verification apparatus may load a target dimension index corresponding to a characteristic detected from the transformation-related information, thereby determining a transformation function suitable for the characteristic. For example, when the transformation-related information defines a target dimension index of an $i^{th}$ projection function among N projection functions as $\{1, 4, 5, \ldots, M\}$, the $i^{th}$ projection function may be expressed as shown in Equation 2 below, for example.

$$f_i = [1,0,0,1,1,0,0, \ldots ,1] \quad \text{Equation 2}$$

As described above, the verification apparatus may determine target dimensional component information based on the characteristic. The target dimensional component information may refer to information associated with information on a target dimension index indicating a target dimensional component. The verification apparatus may load target dimensional component information corresponding to the $i^{th}$ projection function from transformation-related information that defines target dimension indices of the N projection functions. When the $i^{th}$ characteristic is the low-illuminance characteristic, the target dimensional component information may indicate a target dimension index indicating a target dimensional component robust to the low-illuminance environment.

The verification apparatus may perform a projection operation corresponding to the characteristic on the input feature data a and the enrolled feature data b based on the target dimensional component loaded from the database based on the characteristic. The verification apparatus may project the input feature data a and the enrolled feature data b onto a plane of a dimension corresponding to the characteristic.

In operation 524, the verification apparatus may transform the input feature data a using the determined transformation function. The verification apparatus may transform the input feature data a using the transformation function determined in operation 523, thereby generating the input feature transformation data. The verification apparatus may apply a projection function $f_i$ of Equation 2 to the input feature data a of Equation 1, thereby generating the input feature transformation data as shown in Equation 3 below, for example.

$$f_i(a)[v_1,0,0,v_4,v_5,0,0, \ldots ,v_M] \quad \text{Equation 3}$$

In operation 525, the verification apparatus may transform the enrolled feature data b using the determined transformation function. The verification apparatus may transform the enrolled feature data b using the transformation function determined in operation 523, thereby generating the enrolled feature transformation data. As such, an example of applying a same transformation function to both the input feature data a and the enrolled feature data b has been described. When a characteristic satisfies a plurality of conditions, input feature transformation data and enrolled feature transformation data may be generated by applying a plurality of transformation functions.

The verification apparatus may maintain the target dimensional component and exclude the remaining dimensional component, thereby generating the input feature transformation data and the enrolled feature transformation data from the input feature data a and the enrolled feature data b.

In operation 531, the verification apparatus may calculate a similarity between the input feature transformation data and the enrolled feature transformation data. The verification apparatus may calculate a cosine similarity between a feature vector representing the input feature transformation data and a feature vector representing the enrolled feature transformation data. The verification apparatus may calculate a similarity between the input feature transformation data $f_i(a)$ and the enrolled feature transformation data $f_i(b)$ as shown in Equation 4 below, for example.

$$NCC_{f_i}(a, b) = \frac{f_i(a) \cdot f_i(b)}{\|f_i(a)\|\|f_i(b)\|} \quad \text{Equation 4}$$

As shown in Equation 4, the verification apparatus may calculate a normalized cross correlation (NCC) as the similarity between the input feature transformation data $f_i(a)$ and the enrolled feature transformation data $f_i(b)$.

In operation 532, the verification apparatus may compare the calculated similarity and a threshold similarity. The verification apparatus may select a threshold similarity corresponding to the characteristic detected in operation 512. The enrollment database 429 may include N threshold similarities for the N characteristics of the enrolled user. In FIG. 5, $Th_i$ denotes an $i^{th}$ threshold similarity corresponding to the $i^{th}$ characteristic among the N threshold similarities. For example, the $i^{th}$ characteristic may be the low-illuminance characteristic that is the environment characteristic indicating an illuminance of an environment in which the input image is captured is lower than a threshold illuminance. The enrollment database 429 also may include a threshold similarity corresponding to a case in which the transformation function is not applied.

In operation 533, the verification apparatus may determine that the verification for the user corresponding to the input image is successful in response to the similarity being greater than the threshold similarity. The verification apparatus may determine that a user of the input image matches a user of the enrolled image when the similarity calculated in operation 532 is greater than the threshold similarity associated with the low illuminance environment.

In operation 534, the verification apparatus may perform verification of the input image for another enrolled user in response to the similarity being less than or equal to the threshold similarity. For example, returning to operation 525, the verification apparatus may transform enrolled feature data b of another user stored in the enrollment database 429 using the transformation function determined in operation 523. If only one reference user is enrolled in a device, or if the verification has been performed for all enrolled users, the verification apparatus may determine that the verification fails.

In another example, the verification apparatus may calculate a weighted sum of results obtained by applying transformation functions for each of a plurality of characteristics as transformation data in operation 422. In operation 512, the verification apparatus may detect a plurality of characteristics of an input image. In operation 523, the verification apparatus may determine transformation functions corresponding to the detected characteristics. In operation 524, the verification apparatus may calculates a weighted sum of results obtained by applying the transformation functions corresponding to the plurality of characteristics to input feature data a to be input feature transformation data as shown in Equation 5 below, for example.

$$F(a) = \sum_{i=1}^{N} \alpha_i f_i(a) \quad \text{Equation 5}$$

In Equation 5, a number of the detected characteristics is N, N being an integer greater than or equal to 1. $\alpha_i$ denotes a weight of an $i^{th}$ transformation result. F(a) denotes a weighted sum of results of N transformation functions for the input feature data a. In operation 525, the verification apparatus may calculate a weighted sum of results obtained by applying the transformation functions corresponding to the plurality of characteristics enrolled feature data b to be enrolled feature transformation data as shown in Equation 6 below, for example.

$$F(b) = \sum_{i=1}^{N} \alpha_i f_i(b) \quad \text{Equation 6}$$

In Equation 6, F(b) denotes a weighted sum of results of the N transformation functions for the enrolled feature data b. For example, by using Equation 5 and Equation 6, the verification apparatus may apply a transformation function for the low-illuminance characteristic, a transformation function for an accessary characteristic, a transformation function for an eyebrow characteristic, and a transformation function for a mouth shape characteristic to each of the input feature data a and the enrolled feature data b, and calculate a weighted sum of results thereof. The verification apparatus may generate projected transformation data as a feature space robust to the low-illuminance characteristic, the accessary characteristic, the eyebrow characteristic, and the mouth shape characteristic.

In operation 531, according to Equation 5 and Equation 6, the verification apparatus may calculate a similarity $NCC_{final}(a,b)$ between the input feature transformation data and the enrolled feature transformation data as shown in Equation 7 below, for example.

$$NCC_{final}(a, b) = \frac{F(a) \cdot F(b)}{\|F(a)\|\|F(b)\|} \quad \text{Equation 7}$$

The verification apparatus may compare the similarity obtained using Equation 7 and a threshold similarity to verify the input image. The verification apparatus may determine that the verification for the user appearing in the input image is successful in response to the similarity being greater than the threshold similarity. The threshold similarity may be a weighted sum of threshold similarities corresponding to a characteristic, or a maximum value or a minimum value may be selected as the threshold similarity from threshold similarities corresponding to a plurality of characteristics.

Although the verification apparatus detects at least one characteristic in the foregoing examples, the verification apparatus may also calculate a weighted sum of all transformation functions, for example, the N transformation functions to be the input feature transformation data and the enrolled feature transformation data without detecting a characteristic.

In another example, the verification apparatus may skip operation 524 and calculate a similarity between input feature data and enrolled feature data before a transformation function is applied in operation 531. In this example, in operation 532, the verification apparatus may select a threshold similarity corresponding to a case in which a transformation function is not applied, from the enrollment database. The verification apparatus may compare a similarity of the case in which a transformation function is not applied, to the threshold similarity. When the similarity is greater than the threshold similarity, the verification apparatus may determine that the verification is successful in operation 533. When the similarity is less than or equal to the threshold similarity, the verification apparatus may perform verification on another enrolled user in operation 534.

Figure 6:
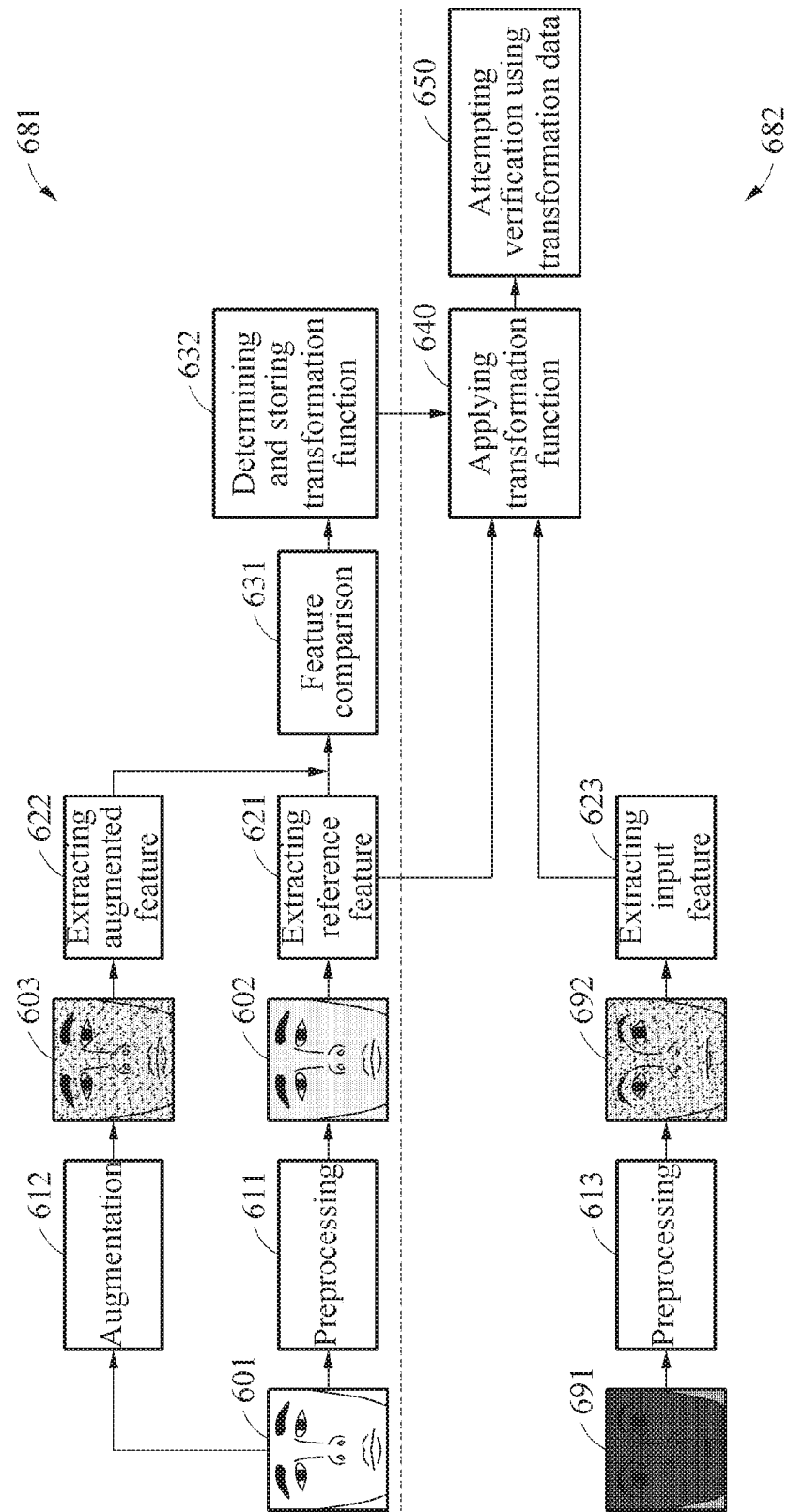
FIG. 6 illustrates an example of an enrollment process for verification.

FIG. 6 is a diagram illustrating an example of an enrollment process for verification.

A verification apparatus may perform an enrollment procedure 681 and a verification procedure 682. The enrollment procedure 681 may include an operation of mapping and storing feature data corresponding to a reference user and a transformation function for each characteristic. The verification procedure 682 may be an operation of verifying whether an input user is a user enrolled in a device, and include an operation of verifying input feature transformation data corresponding to the input user with respect to at least one item of reference feature transformation data corresponding to a reference user enrolled in the device. For example, the reference user enrolled in the device may have an access authority to at least a portion of functions and/or applications of the device.

In the enrollment procedure 681, the verification apparatus may acquire a reference image 601 of a reference user in response to the reference user being enrolled.

In operation 611, the verification apparatus may generate a preprocessed reference image 602 by preprocessing the reference image. In operation 621, the verification apparatus may extract reference feature data of the reference user, based on a feature extraction model (for example, a trained neural network), from the preprocessed reference image 602.

In operation 612, the verification apparatus may augment the reference image 601 based on an augmentation characteristic. The verification apparatus may generate an augmented image by augmenting the reference image 601 to have a low-illuminance environment characteristic among augmentation characteristics. The verification apparatus may augment the reference image 601 for each of a plurality of augmentation characteristics and repeat the following operations for each augmented image. In this disclosure, the augmentation characteristic may refer to a characteristic used in an enrollment procedure. When N types of characteristics are detected by the verification apparatus, the verification apparatus may augment the reference image 601 based on augmentation characteristics corresponding to the N characteristics. Furthermore, the verification apparatus may augment the reference image 601 and apply a preprocessing to the augmented image, thereby generating the augmented image 603. Here, the preprocessing applied to the augmented image may be the same as the preprocessing performed in operation 611. However, a type of preprocessing is not limited thereto, and various types of preprocessing may be applicable.

In operation 622, the verification apparatus may extract augmented feature data, based on a feature extraction model (for example, a trained neural network), from the augmented image 603 obtained by augmenting the reference image 601 based on the augmentation characteristic.

In operation 631, the verification apparatus may compare the reference feature data and the augmented feature data. The verification apparatus may calculate a variation score for each dimensional component based on a comparison between the reference feature data and the augmented feature data. An example of calculating the variation score will be described below with reference to FIG. 8.

In operation 632, the verification apparatus may determine a transformation function associated with the augmentation characteristic based on a comparison between the reference feature data and the augmented feature data, map the transformation function to the reference user, and store the mapped transformation function. The verification apparatus may determine a transformation function associated with the augmentation characteristic based on the variation score.

In the verification procedure 682, the verification apparatus may acquire an input image 691. In operation 613, the verification apparatus may acquire a preprocessed input image 692 by preprocessing the input image 691.

In operation 623, the verification apparatus may extract a feature from the preprocessed input image 692. The verification apparatus may extract input feature data from the preprocessed input image 692 based on a feature extraction model.

The verification apparatus may selects a reference user to be verified from a plurality of enrolled users. The verification apparatus may load reference feature data corresponding to the reference user from a database. Also, the verification apparatus may load target dimensional component information corresponding to the characteristic from a database based on transformation-related information mapped to enrolled feature data of the reference user. As described above, the target dimensional component information is used to define a target dimension index indicating a target dimensional component to be maintained in a corresponding characteristic.

In operation 640, the verification apparatus may apply a transformation function to feature data. The verification apparatus may apply a transformation function to the reference feature data selected from the plurality of enrolled users enrolled in the enrollment procedure 681. Also, the verification apparatus may apply a transformation function to the input feature data corresponding to the input user. The verification apparatus may maintain the target dimensional component and excludes the remaining dimensional component in the input feature data, thereby acquiring input feature transformation data. The verification apparatus may maintain the target dimensional component and exclude the remaining dimensional component in the reference feature data, thereby acquiring reference feature transformation data.

In operation 650, the verification apparatus may perform verification for an input user using the transformation data. The verification apparatus may perform the verification by determining whether the input user corresponding to the input feature data matches the reference user corresponding to the reference feature transformation data based on a similarity between the input feature transformation data and the reference feature transformation data.

Figure 7:
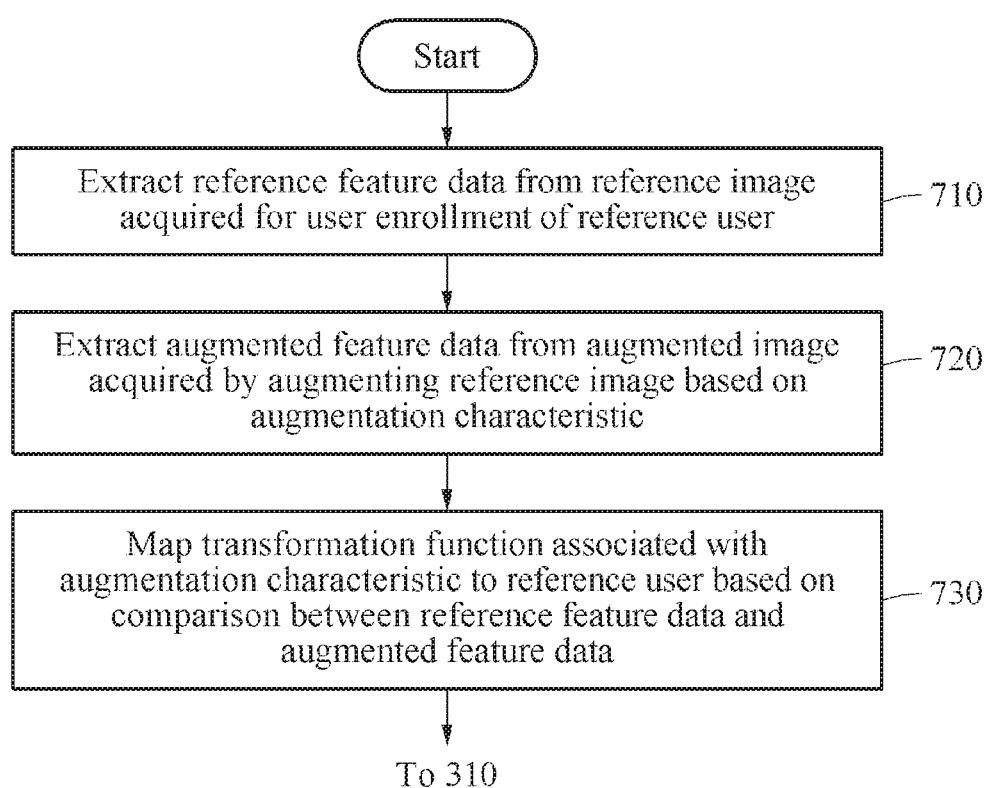
FIGS. 7 and 8 are flowcharts illustrating examples of a user enrollment method.
Figure 8:
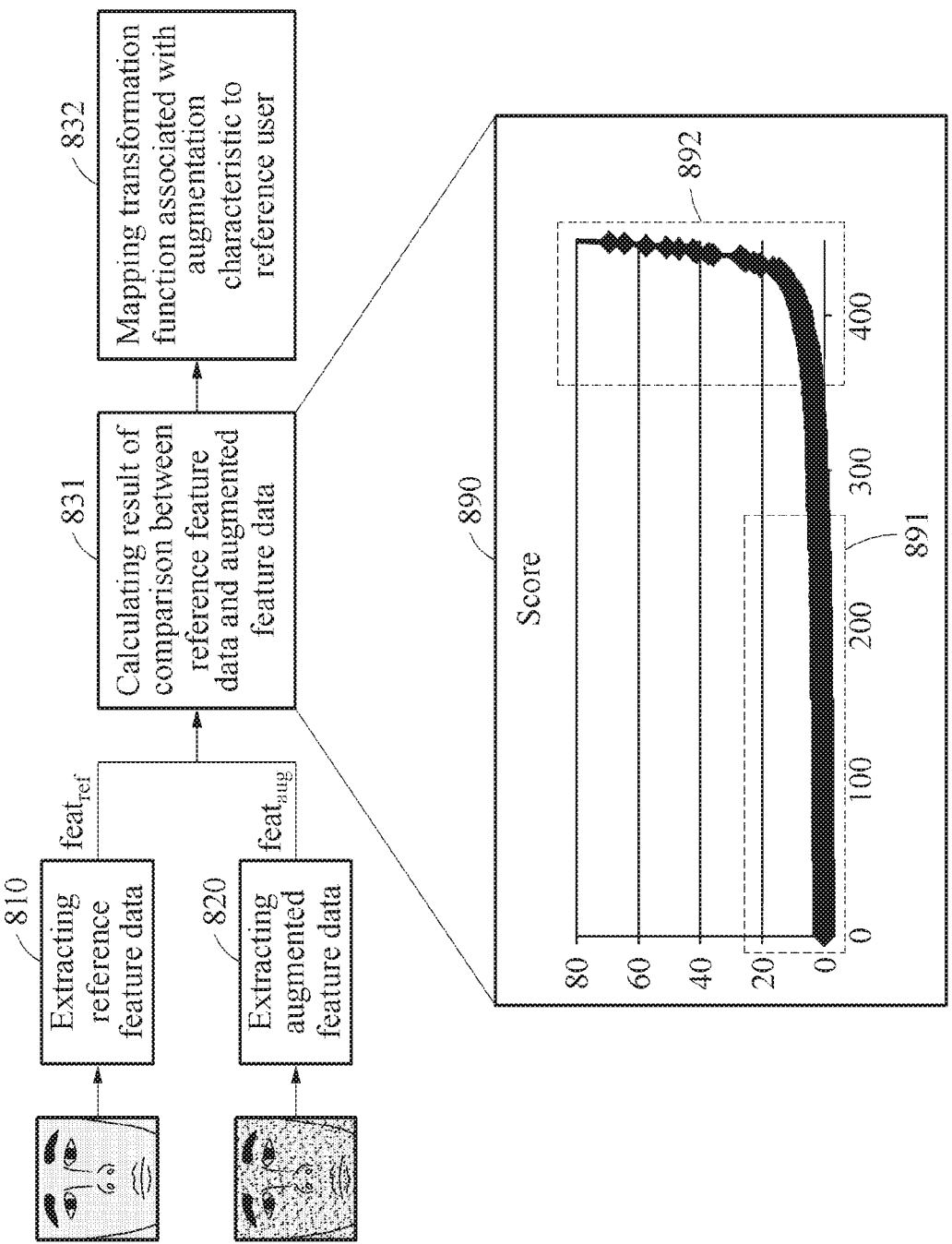

FIGS. 7 and 8 are flowcharts illustrating examples of a user enrollment method.

In operation 710, a verification apparatus may extract reference feature data, based on a feature extraction model (for example, a trained neural network), from a reference image acquired for user enrollment of a reference user. The reference feature data may be represented in a form of a vector. As described in operation 810 of FIG. 8, the verification apparatus may extract reference feature data $feat_{ref}$.

In operation 720, the verification apparatus may extract augmented feature data, based on the feature extraction model, from an augmented image (for example, a low illuminance image which is acquired by augmenting the reference image based on an augmentation characteristic). The verification apparatus may generate an augmented image for each of a plurality of augmentation characteristics as described above with reference to FIG. 6, for example. As shown in operation 820 of FIG. 8, the verification apparatus may calculate augmented feature data $feat_{aug}$.

In operation 730, the verification apparatus may map a transformation function associated with the augmentation characteristic to the reference user based on a comparison between the reference feature data and the augmented feature data. The verification apparatus may map a transformation function optimized in a predetermined characteristic to the reference image based on the reference feature data and the augmented feature data. In operation 831 of FIG. 8, the verification apparatus may calculate a result of comparison between the reference feature data and the augmented feature data. The verification apparatus may calculate variation information 890 for each dimensional component based on the reference feature data and the augmented feature data. In FIG. 8, the variation information 890 indicates a variation score for each dimension index. Feature data may be an M-dimensional feature and, for example, the variation information 890 may indicate a variation score for each of 441 dimension indices. A variation score Score[j] of a $j^{th}$ dimension index among M dimension indices may be expressed as shown in Equation 8 below, for example, where j is an integer of 1 to M inclusive.

$$\text{Score}[j] = \frac{\text{abs}(feat_{ref}(j) - feat_{aug}(j))}{\max(|feat_{ref}(j)|, |feat_{aug}(j)|)} \qquad \text{Equation 8}$$

In Equation 8, the variation score Score[j] indicates a difference between two features relative to a dimensional component size in a predetermined dimension index, for example, j. The variation score Score[j] indicates a variation of a dimensional component changing due to augmentation for each characteristic. A dimension index having a low variation score may indicate a dimensional component including information robust to a change. A dimension index having a high variation score may indicate a dimensional component including information sensitive to a change. The verification apparatus may perform a verification robust to noise by using a dimensional component including information robust to a change with respect to various characteristics.

In operation 832, the verification apparatus may map a transformation function associated with the augmentation characteristic to the reference user. The verification apparatus may determine, to be a target dimensional component 891, a dimensional component corresponding to a dimension index indicating a score less than or equal to a change threshold among a plurality of dimension indices in the variation score. Also, the verification apparatus may determine, to be a remaining dimensional component 892, a dimensional component corresponding to a dimension index indicating a score greater than the change threshold in the variation score. The target dimensional component 891 may be a dimensional component including, for example, geometry information of a face in a low illuminance environment. The remaining dimensional component 892 may be a dimensional component including noise, for example, noise information or context information of the face in the low illuminance environment. As the foregoing, the verification apparatus may map the target dimensional component 891 and the remaining dimensional component 892 determined for each augmentation characteristic to the corresponding reference user and store a result of the mapping.

Although the method of determining the transformation function during the enrollment process of the user has been described with reference to FIGS. 7 and 8, the transformation function may be determined in various methods. For example, the transformation function may be determined and stored prior to the enrollment process of the user. The verification apparatus may generate feature data by applying various reference images and augment images of the reference images to a trained neural network. The verification apparatus may analyze variation information of the feature data in the method described in FIG. 8. Based on the analysis, the verification apparatus may determine a transformation function to be generally applied to a characteristic applied to generate an augmented image, map the determined transformation function to the corresponding characteristic, and store a result of the mapping. Once the characteristic is detected, the verification apparatus may apply the stored transformation function to an image of any enrolled user. The transformation function determined during the enrollment process described in FIGS. 7 and 8 may reflect the individual features of the user, whereas the transformation function determined and stored prior to the enrollment process may provide a performance of verification robust to an environmental change when used universally for a plurality of users.

Also, in response to an input image for user verification being acquired, the verification apparatus may verify the input image using at least one of a plurality of transformation functions mapped to the reference user. For example, the verification apparatus may perform operation 310 of FIG. 3. The verification apparatus may load the target dimensional component 891 and the remaining dimensional component 892 determined for the augmentation characteristic corresponding to the detected characteristic and use the target dimensional component 891 and the remaining dimensional component 892 to transform the input feature data and the enrolled feature data. In the above, a verification method that extracts input feature data by applying an input extraction model to an input image and verifies the input image using input feature transformation data obtained by transforming the input feature data has been described. The method of one or more embodiments may extract feature data corresponding to an input characteristic (for example, a low illuminance characteristic) without need to perform retraining when a trained neural network is present. Accordingly, the method of one or more embodiments may enhance a flexibility of a neural network to be applied to various devices including a mobile device and provide a robust verification performance for various input characteristics without additional training.

Figure 9:
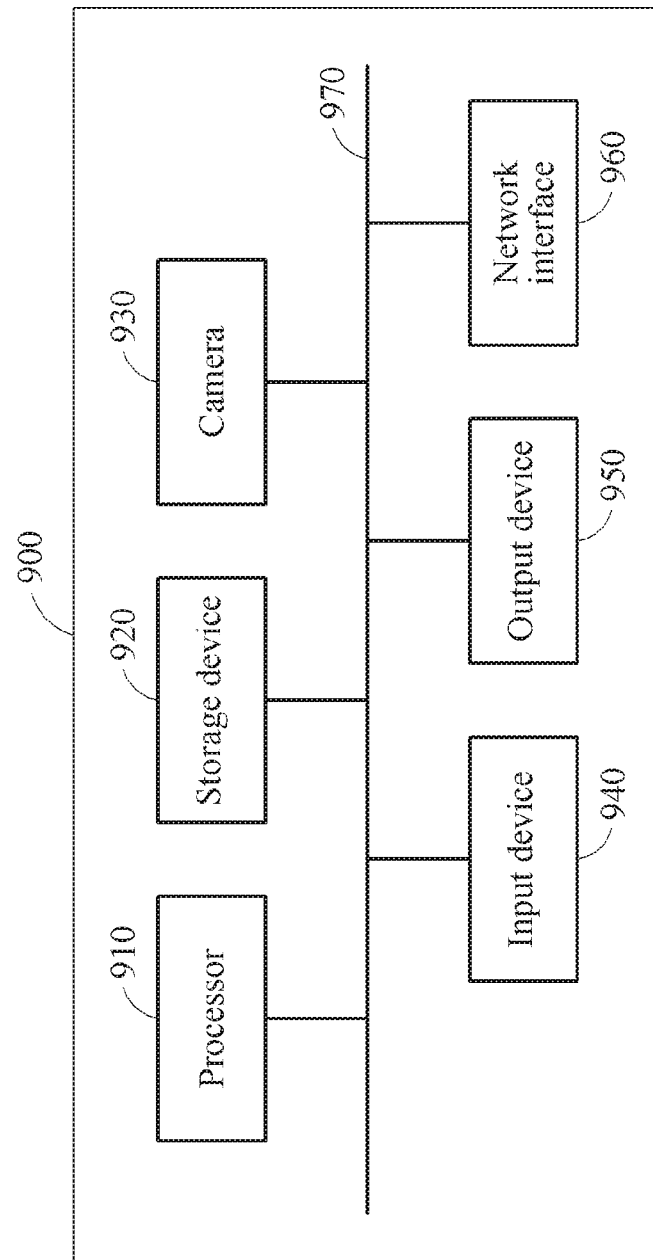
FIG. 9 is a block diagram illustrating an example of a computing apparatus.

FIG. 9 is a block diagram illustrating an example of a computing apparatus.

Referring to FIG. 9, a computing apparatus 900 may be an apparatus for verifying a user using the verification methods described herein. In an example, the computing apparatus 900 may correspond to the verification apparatus 200 described with reference to FIG. 2. The computing apparatus 900 may be, for example, any one of an image processing device, a smartphone, a wearable device, a tablet computer, a netbook, a laptop, a desktop, a personal digital assistant (PDA), a set-top box, a home appliance, a biometric door lock, a security device, a vehicle starter, and the like. The computing apparatus 900 may include the functions of the verification apparatus 200 described with reference to FIG. 2.

Referring to FIG. 9, the computing apparatus 900 may include a processor 910 (e.g., one or more processors), a storage device 920, a camera 930, an input device 940, an output device 950, and a network interface 960. The processor 910, the storage device 920, the camera 930, the input device 940, the output device 950, and the network interface 960 may communicate with one another through a communication bus 970.

The processor 910 may execute functions and instructions. For example, the processor 910 may process instructions stored in the storage device 920. The processor 910 may perform one or more operations described above with reference to FIGS. 1 through 8. The processor 910 may include or correspond to the processor 220 of FIG. 2, as non-limiting examples.

The storage device 920 may store information and data needed for the processor 910 to perform the operations. The storage device 920 may include a computer-readable storage medium or computer-readable storage device. The storage device 920 may store instructions to be executed by the processor 910, and store related information while software or an application is being executed by the computing apparatus 900. The storage device 920 may include or correspond to the memory 230 of FIG. 2, the enrollment database 429 of FIG. 4, and/or the enrollment database 429 of FIG. 5, as non-limiting examples.

The camera 930 may capture an image including a plurality of image frames. For example, the camera 930 may generate an input image and a reference image. The camera 930 may include or correspond to the image acquirer 210 of FIG. 2, as non-limiting examples.

The input device 940 may receive an input from a user through a tactile, video, audio, or tough input. The input device 940 may include, for example, any one or any combination of a keyboard, a mouse, a touchscreen, a microphone, and other devices that may detect an input from a user and transmit the detected input.

The output device 950 may provide an output of the computing apparatus 900 to a user through a visual, auditory, or tactile channel. The output device 950 may include, for example, any one or any combination of a display, a touchscreen, a speaker, a vibration generator, and other devices that may provide an output to a user. The network interface 960 may communicate with an external device through a wired or wireless network.

The verification apparatuses, verification apparatus 200, image acquirers, image acquirer 210, processors, processor 220, memories, memory 230, enrollment databases, enrollment database 429, computing apparatuses, computing apparatus 900, processor 910, storage devices, storage device 920, cameras, camera 930, input devices, input device 940, output devices, output device 950, network interfaces, network interface 960, communication buses, communication bus 970, apparatuses, units, modules, devices, and other components described herein are implemented by or representative of hardware components. Examples of hardware components that may be used to perform the operations described in this application where appropriate include controllers, sensors, generators, drivers, memories, comparators, arithmetic logic modules, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic module, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented verification method comprising:
   detecting a characteristic of an input image;
   acquiring input feature transformation data and enrolled feature transformation data by respectively applying a transformation function determined based on the detected characteristic to input feature data and enrolled feature data, wherein the input feature data is extracted from the input image using a feature extraction model; and
   verifying a user corresponding to the input image based on a result of comparison between the input feature transformation data and the enrolled feature transformation data.

2. The method of claim 1, wherein the input image includes a facial image of the user.

3. The method of claim 1, wherein the verifying of the user comprises determining whether the user is an enrolled user corresponding to the enrolled feature data, and the enrolled feature data was previously extracted using the feature extraction model.

4. The method of claim 1, wherein the characteristic is an illuminance characteristic of the input image.

5. The method of claim 1, wherein the detecting of the characteristic comprises:
   detecting at least one of a landmark characteristic associated with a landmark of an object appearing in the input image and an environment characteristic associated with a capturing environment of the input image.

6. The method of claim 5, wherein the object is a face of the user and the landmark is one of a facial feature and an item disposed on the face.

7. The method of claim 1, wherein the feature extraction model is a trained neural network.

8. The method of claim 7, wherein the trained neural network comprises a convolutional neural network (CNN).

9. The method of claim 1, wherein the transformation function is determined differently for the user than for another user.

10. The method of claim 1, wherein the transformation function is determined in a user-enrollment process comprising enrolling the enrolled feature data.

11. The method of claim 1, wherein the acquiring of the input feature transformation data and the enrolled feature transformation data comprises:
    respectively transforming the input feature data and the enrolled feature data using a linear transformation or a nonlinear transformation determined based on the characteristic.

12. The method of claim 1, wherein
    the detecting of the characteristic comprises detecting a plurality of characteristics of the input image, including the characteristic,
    the acquiring of the input feature transformation data comprises calculating, as the input feature transformation data, a weighted sum of results obtained by applying transformation functions, including the transformation function, corresponding to the plurality of characteristics to the input feature data, and
    the acquiring of the enrolled feature transformation data comprises calculating, as the enrolled feature transformation data, a weighted sum of results obtained by applying the transformation functions to the enrolled feature data.

13. The method of claim 1, wherein the acquiring of the input feature transformation data and the enrolled feature transformation data comprises:
    respectively performing a projection operation corresponding to the characteristic on the input feature data and the enrolled feature data.

14. The method of claim 1, wherein the acquiring of the input feature transformation data and the enrolled feature transformation data comprises:
    determining target dimensional component information based on the characteristic; and
    generating the input feature transformation data and the enrolled feature transformation data respectively based on the input feature data and the enrolled feature data by maintaining a target dimensional component and excluding a remaining dimensional component.

15. The method of claim 12, further comprising:
    selecting a reference user to be verified from a plurality of enrolled users,
    wherein the determining of the target dimensional component information comprises loading target dimensional component information corresponding to the characteristic from a database based on transformation-related information mapped to enrolled feature data of the reference user.

16. The method of claim 1, further comprising:
    selecting a reference user to be verified from a plurality of enrolled users,
    wherein the acquiring of the input feature transformation data and the enrolled feature transformation data comprises loading the transformation function corresponding to the characteristic from a database, among a plurality of transformation functions mapped to enrolled feature data of the reference user.

17. The method of claim 1, further comprising:
    extracting reference feature data from a reference image of a reference user in response to the reference user being enrolled;
    extracting augmented feature data from an augmented image acquired by augmenting the reference image based on an augmentation characteristic; and
    determining a transformation function associated with the augmentation characteristic based on a comparison between the reference feature data and the augmented feature data, mapping the determined transformation function to the reference user, and storing the mapped transformation function.

18. The method of claim 17, wherein
    the augmentation characteristic corresponds to the detected characteristic of the input image.

19. The method of claim 17, wherein the determining of the transformation function comprises:

calculating a variation score for each dimensional component of the reference feature data and the augmented feature data; and determining the transformation function associated with the augmentation characteristic based on the variation score.

20. The method of claim 19, wherein the determining of the transformation function comprises:

determining, to be a target dimensional component, a dimensional component, among the dimensional components, corresponding to a dimension index indicating a variation score less than or equal to a change threshold among a plurality of dimension indices in the variation score; and determining, to be a remaining dimensional component, a dimensional component, among the dimensional components, corresponding to a dimension index indicating a variation score greater than the change threshold in the variation score.

21. The method of claim 1, wherein the verifying of the user corresponding to the input image comprises:

calculating a similarity between the input feature transformation data and the enrolled feature transformation data; and determining that a verification for the user is successful in response to the similarity being greater than a threshold similarity.

22. The method of claim 21, wherein the calculating of the similarity comprises:

calculating a cosine similarity between a feature indicated by the input feature transformation data and a feature indicated by the enrolled feature transformation data.

23. The method of claim 1, wherein the verifying of the user corresponding to the input image comprises:

indicating a result of the verifying of the user.

24. The method of claim 23, wherein the indicating of the result of the verifying of the user comprises:

unlocking a device in response to the result of the verifying of the user being a successful verification.

25. A non-transitory computer-readable storage medium storing instructions that, when executed by one or more processors, configure the one or more processors to perform the method of claim 1.

26. A verification apparatus comprising:

one or more sensors configured to acquire an input image; and one or more processors configured to:

detect a characteristic of the input image, acquire input feature transformation data and enrolled feature transformation data by respectively applying a transformation function determined based on the detected characteristic to input feature data and enrolled feature data, wherein the input feature data is extracted from the input image using a feature extraction model and the enrolled feature data is previously extracted using the feature extraction model, and verify a user corresponding to the input image based on a result of comparison between the input feature transformation data and the enrolled feature transformation data.

27. The apparatus of claim 26, wherein the apparatus is any one of an image processing device, a smartphone, a wearable device, a tablet computer, a netbook, a laptop, a desktop, a personal digital assistant (PDA), a set-top box, a home appliance, a biometric door lock, a security device, and a vehicle starter, and the one or more sensors comprise a camera.

28. A processor-implemented user enrollment method comprising:

extracting reference feature data from a reference image acquired for user enrollment of a reference user;

extracting augmented feature data from an augmented image acquired by augmenting the reference image based on an augmentation characteristic;

mapping a transformation function associated with the augmentation characteristic to the reference user based on a comparison between the reference feature data and the augmented feature data, and storing enrolled feature data for the reference user; and verifying an input image using the transformation function in response to the input image being acquired, the verifying including respectively applying the transformation function to input feature data extracted from the input image and the enrolled feature data and acquiring input feature transformation data and enrolled feature transformation data based on a result of the respectively applying.

29. A processor-implemented verification method comprising:

acquiring a transformation function corresponding to a characteristic of an input image including a face of a user;

generating input feature transformation data by transforming input feature data of the input image using the transformation function;

generating enrolled feature transformation data by transforming enrolled feature data of an enrolled user using the transformation function; and verifying whether the user is the enrolled user based on a comparison of the input feature transformation data and the enrolled feature transformation data.

30. The method of claim 29, wherein the transformation function is generated by:

generating reference feature data from an image of the enrolled user;

generating an augmented image by augmenting the image of the enrolled user to include the characteristic;

generating augmented feature data from the augmented image; and generating the transformation function based on a comparison of the reference feature data and the augmented feature data.

* * * * *